US005943969A

United States Patent [19]

Peake

[11] Patent Number: 5,943,969

[45] Date of Patent: Aug. 31, 1999

[54] ASHING FURNACE AND METHOD

[75] Inventor: Steven C. Peake, Dubuque, Iowa

[73] Assignee: Barnstead/Thermolyne Corporation, Dubuque, Iowa

[21] Appl. No.: 09/087,532

[22] Filed: May 29, 1998

Related U.S. Application Data

[63] Continuation of application No. 08/688,813, Jul. 31, 1996, which is a continuation of application No. 08/355,914, Dec. 14, 1994, Pat. No. 5,558,029.

[51] Int. Cl.[6] ................................ F23B 5/00; F23G 5/00; A21B 1/00

[52] U.S. Cl. .......................... 110/210; 110/217; 110/233; 110/242; 110/250; 219/391; 219/395; 219/396; 219/406; 219/408

[58] Field of Search .................................... 110/210, 217, 110/233, 242, 250, 345, 216; 126/116 C, 263.01, 263.02; 422/99, 101, 102, 165, 168; 219/391, 392, 395, 396, 401, 402, 406, 408, 476, 478

[56] References Cited

U.S. PATENT DOCUMENTS

| | | | |
|---|---|---|---|
| Re. 34,373 | 9/1993 | Collins et al. . | |
| 2,855,494 | 4/1958 | Kuebler . | |
| 2,962,987 | 12/1960 | Hebert et al. | 110/210 |
| 2,982,840 | 5/1961 | McCutcheon . | |
| 3,055,206 | 9/1962 | Watson et al. . | |
| 3,292,417 | 12/1966 | Hayden et al. . | |
| 3,352,259 | 11/1967 | Salmon | 110/217 |
| 3,496,890 | 2/1970 | La Rue . | |
| 3,516,371 | 6/1970 | Zippay . | |
| 3,536,457 | 10/1970 | Henderson et al. . | |
| 3,613,607 | 10/1971 | Hacker . | |
| 3,615,248 | 10/1971 | Holler, Jr. . | |
| 3,668,833 | 6/1972 | Cahill, Jr. . | |
| 3,671,195 | 6/1972 | Bersin . | |
| 3,808,619 | 5/1974 | Vanderveer . | |
| 3,813,918 | 6/1974 | Moe . | |
| 3,822,111 | 7/1974 | Suzuki et al. . | |
| 3,880,143 | 4/1975 | Hart et al. . | |
| 3,890,825 | 6/1975 | Davis . | |
| 3,916,670 | 11/1975 | Davis et al. . | |

(List continued on next page.)

FOREIGN PATENT DOCUMENTS

| | | | |
|---|---|---|---|
| 0185931 | 7/1986 | European Pat. Off. . | |
| 3112976 | 1/1983 | Germany . | |
| 33 18 796 A1 | 11/1984 | Germany | 110/210 |
| 52-16881 | 2/1977 | Japan | 110/217 |
| 63-279012 | 11/1988 | Japan | 110/250 |
| 1-300111 | 12/1989 | Japan | 110/242 |
| 653513 | 5/1951 | United Kingdom . | |
| 702578 | 1/1954 | United Kingdom . | |
| 9423279 | 10/1994 | WIPO . | |

OTHER PUBLICATIONS

CEM Corporation, *Moisture/Solids Analyzer 1981.*

ASTM, *Standards*, D3172–73, D3173–73, D3174–73, D3175–77 1979.

Fisher Scientific Company, *Fisher Sulfur Analyzer System: totally automated—with unsurpassed repeatability, economy, and operating ease*, Apr. 1981.

J. F. Jelenko & Co., *Jelenko Airguard Operating and Maintenance Instructions*, ©1991.

Strassentest, *The new Thermoanalysis System from Strassentest.*

*Primary Examiner*—Ira S. Lazarus
*Assistant Examiner*—Ljiljana V. Ciric
*Attorney, Agent, or Firm*—Wood, Herron & Evans, L.L.P.

[57] ABSTRACT

A furnace comprises an enclosure, a hearth plate within the enclosure for supporting combustible material, a first heater element adjacent the hearth plate for initial combustion of the combustible material, a filter disposed above the hearth plate for filtering uncombusted products of combustion of the combustible material, and a second heater element adjacent the filter for final combustion of the uncombusted products of combustion filtered by the filter. A controller controls the first and second heater elements independently.

3 Claims, 2 Drawing Sheets

U.S. PATENT DOCUMENTS

| | | | |
|---|---|---|---|
| 3,924,547 | 12/1975 | Werner . | |
| 4,009,605 | 3/1977 | Kober . | |
| 4,026,665 | 5/1977 | Mansfield et al. . | |
| 4,106,329 | 8/1978 | Takahashi et al. . | |
| 4,142,403 | 3/1979 | Lohnes et al. . | |
| 4,165,633 | 8/1979 | Raisanen . | |
| 4,165,791 | 8/1979 | Smith . | |
| 4,248,315 | 2/1981 | Falinower . | |
| 4,269,592 | 5/1981 | Benton et al. . | |
| 4,270,898 | 6/1981 | Kelly . | |
| 4,291,775 | 9/1981 | Collins . | |
| 4,299,115 | 11/1981 | Athey et al. . | |
| 4,303,615 | 12/1981 | Jarmell et al. . | |
| 4,398,835 | 8/1983 | Athey et al. . | |
| 4,449,921 | 5/1984 | Catallo . | |
| 4,460,332 | 7/1984 | Lawler et al. . | |
| 4,462,963 | 7/1984 | O'Brien et al. . | |
| 4,485,284 | 11/1984 | Pakulis . | |
| 4,495,873 | 1/1985 | Blankenship | 110/250 |
| 4,507,529 | 3/1985 | Smith et al. . | |
| 4,522,787 | 6/1985 | O'Brien et al. . | |
| 4,522,788 | 6/1985 | Sitek et al. . | |
| 4,554,132 | 11/1985 | Collins . | |
| 4,562,795 | 1/1986 | Kraus . | |
| 4,565,669 | 1/1986 | Collins et al. . | |
| 4,566,312 | 1/1986 | Collins et al. . | |
| 4,566,804 | 1/1986 | Collins et al. . | |
| 4,599,952 | 7/1986 | Meier . | |
| 4,606,650 | 8/1986 | Harris . | |
| 4,651,285 | 3/1987 | Collins et al. . | |
| 4,681,996 | 7/1987 | Collins et al. . | |
| 4,753,889 | 6/1988 | Collins . | |
| 4,759,298 | 7/1988 | Koptis et al. . | |
| 4,789,332 | 12/1988 | Ramsey et al. . | |
| 4,793,292 | 12/1988 | Engstrom et al. . | |
| 4,829,914 | 5/1989 | Boucher | 110/234 |
| 4,846,292 | 7/1989 | Narukawa . | |
| 4,862,813 | 9/1989 | Levin et al. . | |
| 4,874,950 | 10/1989 | Regimand . | |
| 4,878,839 | 11/1989 | Wunning . | |
| 4,937,411 | 6/1990 | Suzuki et al. . | |
| 4,964,734 | 10/1990 | Yoshida et al. . | |
| 5,002,398 | 3/1991 | Musil . | |
| 5,002,399 | 3/1991 | Akinc et al. . | |
| 5,066,843 | 11/1991 | Revesz . | |
| 5,081,046 | 1/1992 | Scheider . | |
| 5,085,527 | 2/1992 | Gilbert . | |
| 5,086,713 | 2/1992 | Dessi' | 110/250 |
| 5,127,827 | 7/1992 | Hoetzl et al. . | |
| 5,164,161 | 11/1992 | Feathers et al. | 422/109 |
| 5,176,445 | 1/1993 | Mize . | |
| 5,200,155 | 4/1993 | Obermueller . | |
| 5,207,008 | 5/1993 | Wimberger et al. . | |
| 5,211,252 | 5/1993 | Henderson et al. . | |
| 5,251,564 | 10/1993 | Rim et al. . | |
| 5,279,971 | 1/1994 | Schneider . | |
| 5,318,754 | 6/1994 | Collins et al. . | |
| 5,525,782 | 6/1996 | Yoneno et al. | 219/682 |

ASHING FURNACE AND METHOD

This is a request for filing, under 37 CFR § 1.53(b), a(n): Continuation of prior application Ser. No. 08/688,813, filed on Jul. 31, 1996, which is a continuation of U.S. Ser. No. 08/355,914 filed Dec. 14, 1994, now U.S. Pat. No. 5,558,029 issued Sep. 24, 1996.

FIELD OF THE INVENTION

This invention relates generally to furnaces, and more particularly to furnaces for ashing or burnout applications for determining the weight loss of a specimen as one or more of its constituents are burned off.

BACKGROUND OF THE INVENTION

So-called ashing furnaces have been used to determine the weight loss of a specimen as one or more of its constituents are burned off. A typical ashing furnace includes an enclosure, a heating element for applying heat to and combusting the combustible portion of the material within the enclosure, and a weigh scales for weighing the specimen before, during and after one or more of its combustible constituents are burned off.

One application of ashing furnaces is in the area of asphalt ashing where it is desired to determine the binder content in asphalt by burning the binder off from a sample of asphalt. Asphalt typically is comprised of 93½% by weight rock, sand and other particulate matter, for example rock dust, 6% light crude (binder) and ½% other matter. The sample of asphalt is weighed before combustion and after combustion. Combustion occurs at approximately 1,000° F., a temperature at which the 93½% by weight rock, sand and particulate matter is inert. The sample is weighed after its weight rate of change with respect to time is approximately zero (i.e. weight change stabilizes), and the post-combustion weight is compared to the pre-combustion weight to determine the weight of the binder burned off and thus contained within the starting sample.

One drawback of conventional ashing furnaces is that the furnace does not completely combust the combustible portion of the sample. As such, uncombusted products of combustion escape out of the furnace through an exhaust port. Discharging the uncombusted products of combustion into the atmosphere is of course undesirable from an environmental standpoint.

One solution to provide more complete combustion is with the use of a so-called catalytic converter, wherein exhaust gases produced by combustion of a material are trapped in a catalytic material and the residual heat in the exhaust provides additional secondary combustion of the gaseous material. The drawback with catalytic conversion is the inability to control the secondary combustion temperature. That is to say, the temperature of the primary combustion exhaust gases effectively determines the temperature at which secondary combustion occurs in the catalytic converter, which limits the amount of material that can be combusted secondarily.

Another solution is to provide dual combustion chambers with separate heating elements, such that uncombusted products of combustion in the first combustion chamber may be combusted more completely in the second combustion chamber. The disadvantage of such a device is that it is costly to manufacture due to duplication of the chambers. Further, the gaseous material may pass through the secondary combustion chamber too quickly to allow full secondary combustion.

It is therefore a main objective of the present invention to provide an ashing furnace which reduces the discharge of uncombusted products of combustion into the atmosphere.

It is another objective of the present invention to provide an ashing furnace which provides for more complete combustion of the combustible material.

It is yet another objective of the present invention to provide an ashing furnace which provides secondary combustion, the temperature at which is not dependent upon the exhaust gases of the primary combustion.

It is still another objective of the present invention to provide an ashing furnace which provides secondary combustion but which does not require separate combustion chambers.

SUMMARY OF THE INVENTION

The present invention attains the stated objectives by providing a furnace comprising an enclosure, a hearth plate within the enclosure for supporting combustible material, a first heater element adjacent the hearth plate for initial combustion of the combustible material, a filter disposed above the hearth plate for filtering uncombusted products of combustion of the combustible material, and a second heater element adjacent the filter for final combustion of the uncombusted products of combustion filtered by the filter.

The furnace includes a controller operable to independently control the heat output of the first and second heater elements. The furnace includes a top, bottom and rear wall, two side walls and an access door. The first heater element comprises a heater plate mounted on the furnace bottom wall and a pair of heater plates each of which is mounted on one of the furnace side walls. The second heater element comprises a heater plate mounted on the furnace top wall. The furnace further comprises a weigh scale, with the hearth plate being supported on the weigh scale such that the combustible material may be continuously weighed during combustion.

The filter preferably comprises a pair of spaced filters, with one of the pair of filters being a coarse filter and the other of the pair of filters being a fine filter. The fine filter is disposed above the coarse filter. The fine filter has approximately 50 to 65 pores per inch, each pore being approximately 0.01 to 0.015 inch in diameter, and the coarse filter has approximately 30 pores per inch, each pore being approximately 0.02 to 0.03 inch in diameter. Both the coarse and fine filters are reticulated ceramic filters.

The furnace further includes a first temperature sensor adjacent the first heater element and a second temperature sensor adjacent the second heater element, the temperature sensors being operable to send signals to the controller, the controller being operable to control the heat output of the first and second heater elements respectively in response thereto.

The hearth plate is supported atop a plurality of posts which are supported atop the weigh scale. The posts pass through holes in the furnace bottom wall. The holes are of a dimension larger than the posts to provide clearance between the posts and holes thereby providing an air inlet for combustion of the combustible material. A blower is mounted above the furnace top wall and draws air into the enclosure via the holes.

The present invention also provides methods of completely combusting a combustible material in a furnace.

One advantage of the present invention is that an ashing furnace is provided which reduces the amount of uncombusted products of combustion discharged into the atmosphere.

Another advantage of the present invention is that an asphalt ashing furnace is provided which provides for more complete combustion of the combustible material within the furnace.

Yet another advantage of the present invention is that the temperature of secondary combustion is not dependent on the temperature of the exhaust gases produced by the primary combustion as in a catalytic converter.

Still another advantage of the present invention is that two separate combustion chambers are not required to provide secondary combustion.

These and other objects and advantages of the present invention will become more readily apparent during the following detailed description taken in conjunction with the drawings herein, in which:

DETAILED DESCRIPTION OF THE INVENTION

Figure 1:
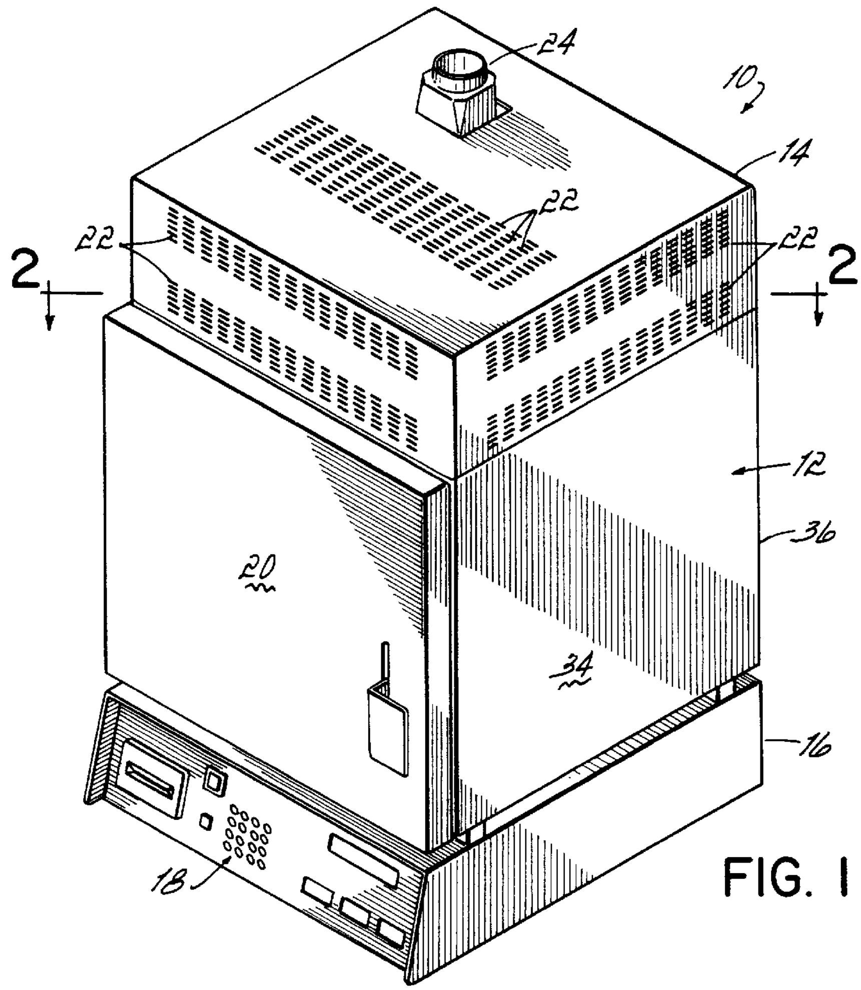
FIG. 1 is a perspective view of the ashing furnace of the present invention.

Referring first to FIG. 1, there is illustrated an ashing furnace 10 according to the principles of the present invention. The ashing furnace 10 includes an enclosure 12 having an outer blower hood 14 mounted thereatop, the enclosure 12 being supported atop a base 16 including an operator input and display panel 18 for entry of data to ashing furnace 10 and for display of weight information, and housing a controller 19, for example a Model 808 from Eurotherm, Reston, Va., for controlling the operation of ashing furnace 10. An access door 20 is provided for gaining access to the interior of enclosure 12. Outer hood 14 includes a plurality of air intake slots 22 for drawing in ambient air to an inner hood 26 which also includes a plurality of air intake slots 28. A blower 76 is mounted to inner hood 26. A discharge outlet 24 is provided on hood 14 and is vented to the atmosphere.

Figure 2:
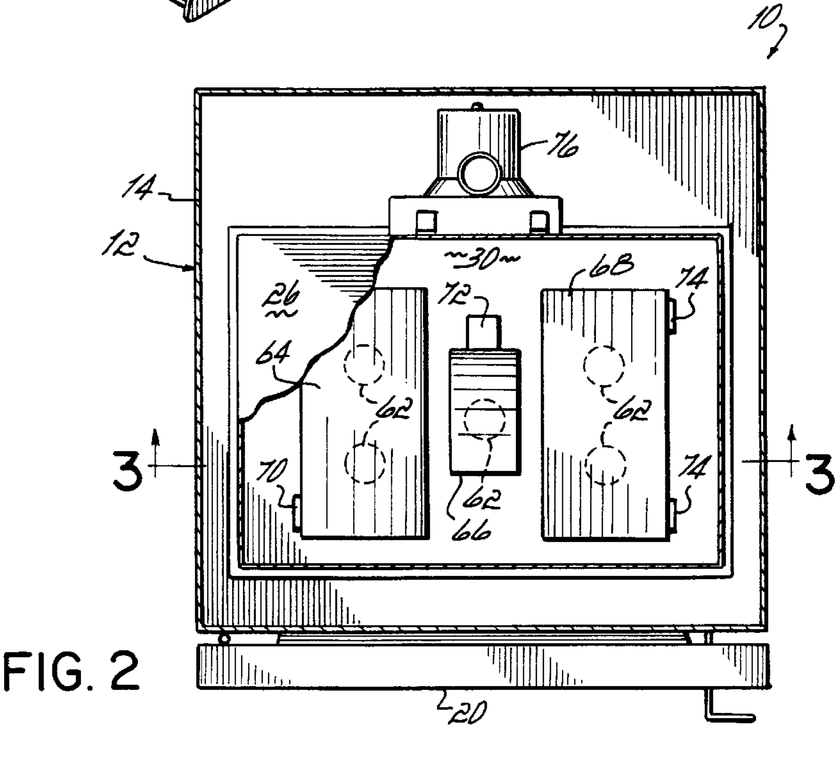
FIG. 2 is a cross-sectional view of the furnace of FIG. 1 taken along line 2—2 of FIG. 1.
Figure 4:
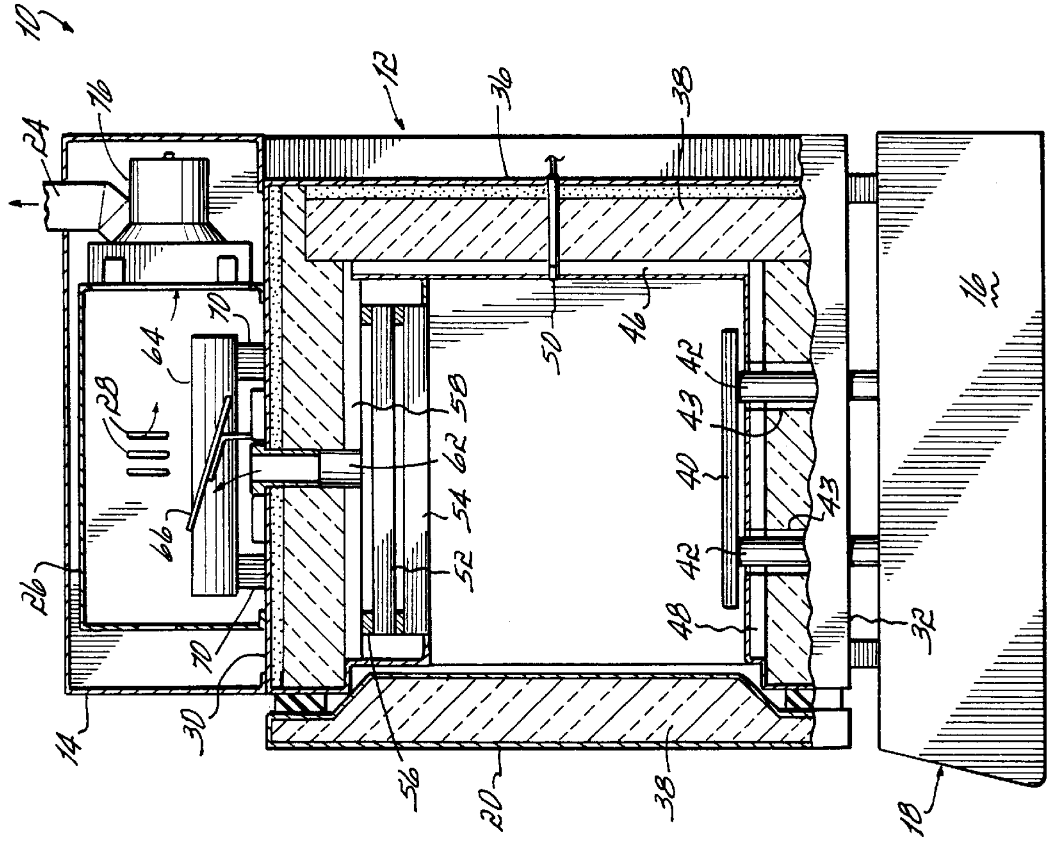
FIG. 4 is a cross-sectional view of the furnace of FIG. 1 taken along line 4—4 of FIG. 3.
Figure 3:
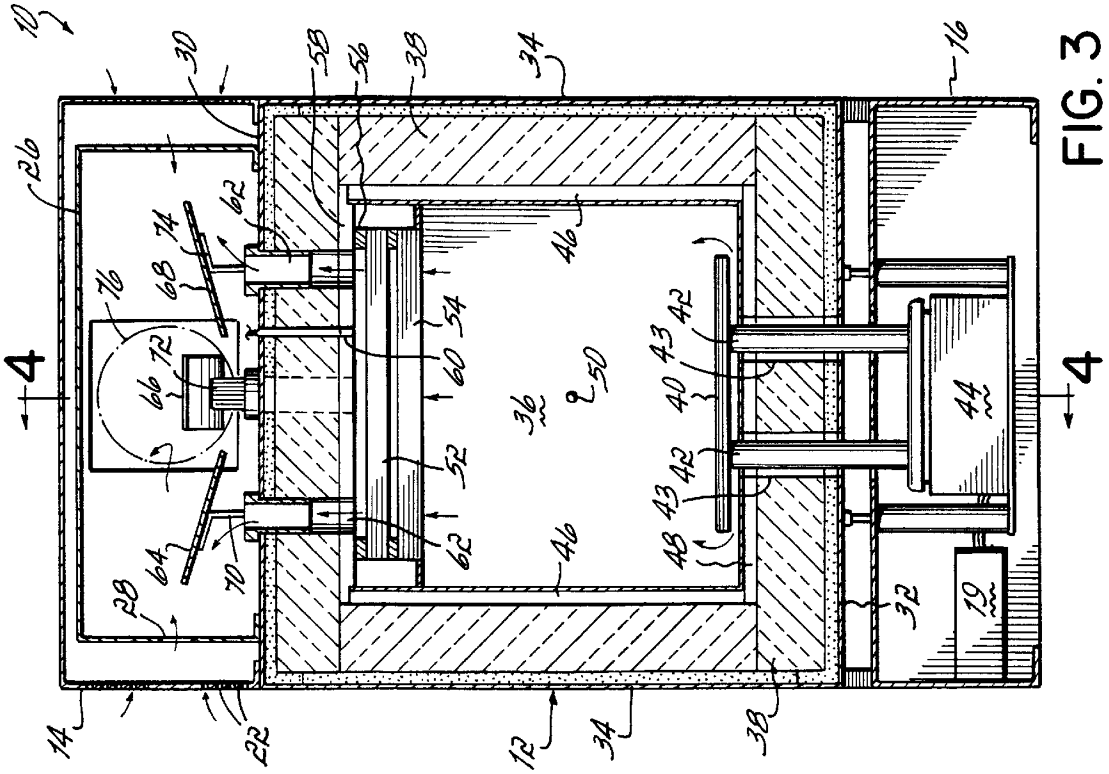
FIG. 3 is a cross-sectional view of the furnace of FIG. 1 taken along line 3—3 of FIG. 2.

Referring now to FIGS. 2–4, enclosure 12 includes a top wall 30, bottom wall 32, a pair of side walls 34 and a rear wall 36. The walls 30, 32, 34 and 36 include thermal insulation 38 disposed on the interior sides of the walls 30, 32, 34 and 36. Access door 20 also includes thermal insulation on the interior side thereof.

A hearth plate 40, fabricated from alumina, is disposed within the interior of the enclosure 12 and is for supporting a specimen thereatop. Hearth plate 40 is supported atop four ceramic posts 42, which themselves are supported atop a weigh scale 44, for example, a GT-8000 balance, available from Ohaus, Florham Park, N.J., which provides a readout on panel 18 of the weight of the specimen supported atop the hearth plate 40 during combustion.

The area adjacent the hearth plate 40, and hence a specimen supported atop the hearth plate 40, is heated via a plurality of heater plates, themselves also fabricated of alumina. Side wall heater plates 46 are mounted to the sides 34 of the furnace 10. A bottom wall heater plate 48 is mounted to the bottom wall 32 of the furnace 10. Each heater plate 46 and 48 may be, for example, a EL445X3, available from the assignee Barnstead-Thermolyne, Dubuque, Iowa. A thermocouple 50 is centrally mounted on the rear wall 36 approximately ⅛ inch from the wall 36 and senses the temperature in the area in the furnace 10 adjacent a specimen supported atop the hearth plate 40. Thermocouple 50 may be, for example, a TC445X1A, available from the assignee Barnstead-Thermolyne, Dubuque, Iowa. Thermocouple 50 transmits signals to the controller 19, which includes a suitable microprocessor programmed with appropriate software, for example proportional integral derivative ("PID") software, which drives a solid state relay (not shown), which controller 19 maintains the temperature of the heater plates 46 and 48 at a preselected temperature using closed-loop thermostatic control techniques well known in the art. For typical asphalt ashing applications, the operating temperatures in the area of the hearth plate 40 are on the order of 300° C. to 600° C.

Mounted near the top wall 30 is a pair of reticulated ceramic foam filters 52 and 54. The lower filter 54 is a "coarse" filter having approximately 30 pores per inch, each pore being approximately 0.02 to 0.03 inch in diameter, whereas the top filter is a "fine" filter having approximately 50 to 65 pores per inch, each pore being approximately 0.01 to 0.015 inch in diameter. Filters 52 and 54 are available from Selee corporation, Hendersonville, N.C. A high temperature gasket 56 mounts the filters 52 and 54 to the top wall 30. Each filter 52 and 54 is approximately ⅞ inch thick, and the filters 52 and 54 are spaced apart by about 3/16 inch. An alumina heater plate 58 is mounted above the filters 52 and 54 by about 3/16 inch and to the top wall 30. Like heater plates 46 and 48, each heater plate 58 may be, for example, a EL445X3, available from the assignee Barnstead-Thermolyne, Dubuque, Iowa. A thermocouple 60 mounted to the top wall 30 senses the temperature adjacent the top wall heater plate 58. Like the thermocouple 50, thermocouple 60 transmits signals to the controller 19, which drives a solid state relay (not shown) to maintain the temperature of the heater plate 58 at a preselected temperature using closed-loop thermostatic control techniques, and may be, for example, a TC445X1A, available from the assignee Barnstead-Thermolyne, Dubuque, Iowa. For typical ashing applications, this heater plate 58 operates at temperatures on the order of 700° C. to 800° C.

Five vent holes 62 approximately 1 inch in diameter pass through the top wall 30 and heater plate 58 thereby providing for fluid communication between the interior of the enclosure 12 and the interior of the fan hood 14. Three flame deflectors 64, 66 and 68 are mounted on brackets 70, 72 and 74 respectively. These flame deflectors 64, 66 and 68 deflect any flames which pass through the holes 62 upwardly into the interior of the inner blower housing 26 to prevent the flames from entering the blower 76. Further, outer hood or housing 14 spaced from inner hood 26 creates an insulating space to keep the outer housing 14 at a reasonable temperature.

In use, an asphalt specimen is loaded atop the hearth plate 40, and may be contained within a stainless steel mesh basket (not shown) on a stainless steel tray (not shown) atop the hearth plate 40. The heater plates 46, 48 and 58 are activated by a user via panel 18. The is temperature adjacent the sample is monitored by the thermocouple 50, and the temperature adjacent the filters 52 and 54 is monitored by the thermocouple 60. The operating temperatures in the area of the hearth plate 40 are on the order of 300° C. to 600° C., whereas the operating temperatures in the area of the top wall heater plate 58 are on the order of 700° C. to 800° C. The temperatures of the filters 52 and 54 range from between approximately 550° C. at the lower surface of the coarse filter 54 to approximately 750° C. at the top surface of the fine filter 52. The blower 76 draws in ambient outside air into the blower hood 14 through slots 22 and into hood 26 through slots 28. Additionally, air enters the interior of the enclosure 12 through holes 43 in the bottom wall 32 which allow the ceramic posts 42 supporting the hearth plate 40 to pass therethrough. Holes 43 are of a larger diameter than posts 42 to allow a clearance for sufficient air intake. Posts 42 are approximately ¾ inch in diameter, whereas holes 43 are approximately 1.25 inch in diameter.

The sample placed on hearth plate 40 is initially combusted, resulting in coarse black smoke which includes uncombusted products of combustion, namely, gases including heavy carbon organics as well as volatile carbon organics. These gases travel upwardly with the flow of air inside the enclosure 12 and are filtered by the filters 52 and 54. A second stage of burning is created by the top wall heater plate 58 combusting the carbon organics filtered out and collected in, or otherwise blocked from passing upwardly and out of furnace 10 by, the filters 52 and 54. The larger or heavy carbon organic material filtered out of the upward air stream and collected in the filters 52 and 54 is thus completely combusted, yielding only a light white smoke to be discharged from furnace 10.

The gases exiting the fan housing 14, cooled by the ambient air drawn into the housing 14 through slots 22, are at approximately 120° C. to 135° C. and are ported outside the building through vent or discharge outlet 24.

The weight of the specimen may be continuously monitored on the panel 18. Once the weight change of the specimen has stabilized, the access door 20 is opened, the specimen is removed and a new specimen is placed into the furnace 10 for ashing.

Those skilled in the art will readily recognize numerous adaptations and modifications which can be made to the present invention which will result in an improved ashing furnace, yet all of which will fall within the spirit and scope of the present invention as defined in the following claims. For example, while in its preferred form the invention includes only a single combustion chamber but within which are two combustion zones, the filtering and secondary combustion technique of the present invention could be employed in ashing apparatus having dual or separate combustion chambers. Accordingly, the invention is to be limited only by the scope of the following claims and their equivalents.

What is claimed is:

1. A furnace having upstream and downstream air flow directions and being for use in analyzing materials, said furnace comprising:

an enclosure;

a support within said enclosure for supporting a sample including combustible and uncombustible material;

a first heater element adjacent said support for initial combustion of the combustible material of the sample;

means disposed downstream of said first heater element for inhibiting the flow out of said furnace of uncombusted products of the combustible material of the sample while permitting the flow of exhaust gases through said means and out of said furnace;

a second heater element adjacent said means for secondary combustion of the uncombusted products the flow of which is inhibited by said means; and a weight indicating device supporting said support, the sample thereby being able to be weighed before and after initial combustion of the combustible material thereof.

2. The furnace of claim 1 wherein said means comprises at least one filter.

3. The furnace of claim 1 wherein said means comprises a pair of filters, one of said pair of filters being a course filter and the other of said pair of filters being a fine filter.

* * * * *